(12) United States Patent
Ohashi et al.

(10) Patent No.: US 10,416,867 B2
(45) Date of Patent: Sep. 17, 2019

(54) DISPLAY CONTROL APPARATUS AND DISPLAY CONTROL METHOD

(71) Applicants: SONY CORPORATION, Tokyo (JP); JAPANESE FOUNDATION FOR CANCER RESEARCH, Tokyo (JP)

(72) Inventors: Takeshi Ohashi, Kanagawa (JP); Shigeatsu Yoshioka, Kanagawa (JP); Toru Mitome, Tokyo (JP); Takuya Narihira, Tokyo (JP)

(73) Assignees: SONY CORPORATION, Tokyo (JP); JAPANESE FOUNDATION FOR CANCER RESEARCH, Tokyo (JP)

( * ) Notice: Subject to any disclaimer, the term of this patent is extended or adjusted under 35 U.S.C. 154(b) by 212 days.

(21) Appl. No.: 14/899,118

(22) PCT Filed: May 22, 2014

(86) PCT No.: PCT/JP2014/002693
§ 371 (c)(1),
(2) Date: Dec. 16, 2015

(87) PCT Pub. No.: WO2014/203454
PCT Pub. Date: Dec. 24, 2014

(65) Prior Publication Data
US 2016/0139758 A1     May 19, 2016

(30) Foreign Application Priority Data
Jun. 19, 2013   (JP) .................. 2013-128084

(51) Int. Cl.
*G06F 3/0485*   (2013.01)
*G06F 3/0484*   (2013.01)
(Continued)

(52) U.S. Cl.
CPC ........ *G06F 3/0485* (2013.01); *G06F 3/04845* (2013.01); *G06F 3/14* (2013.01);
(Continued)

(58) Field of Classification Search
None
See application file for complete search history.

(56) References Cited

U.S. PATENT DOCUMENTS 5,411,272 A * 5/1995 Naka ..................... G09G 1/007
                                                         345/473
5,757,353 A * 5/1998 Yokota ................. G09G 3/3611
                                                         345/685
(Continued)

FOREIGN PATENT DOCUMENTS

| JP | 2002-022470 A | 1/2002 |
| JP | 2005-148661 A | 6/2005 |

(Continued)

OTHER PUBLICATIONS

Extended European Search Report issued in Appln. No. EP14 81 3400, dated Jan. 12, 2017 (7 pp).
(Continued)

*Primary Examiner* — Phenuel S Salomon
(74) *Attorney, Agent, or Firm* — Chip Law Group

(57) ABSTRACT

A display control apparatus that is a first aspect of the present disclosure includes: an acquisition unit that obtains an input image; and a display control unit that displays the input image on a screen by scrolling the input image along a predetermined scroll line, the display control unit displaying the input image by scrolling the input image along the scroll line different according to a scroll speed that is a speed in the scrolling. The present disclosure can be applied to, for example, a case where a medical image is diagnosed.

14 Claims, 17 Drawing Sheets

(51) Int. Cl.
*G06T 7/00* (2017.01)
*G06F 3/14* (2006.01)
*G09G 5/34* (2006.01)
*G09G 5/42* (2006.01)

(52) U.S. Cl.
CPC ........... *G06T 7/0012* (2013.01); *G09G 5/346* (2013.01); *G09G 5/42* (2013.01); *G06F 2203/04806* (2013.01); *G06T 2207/30004* (2013.01); *G09G 2340/045* (2013.01); *G09G 2340/0464* (2013.01); *G09G 2370/022* (2013.01); *G09G 2380/08* (2013.01)

(56) References Cited

U.S. PATENT DOCUMENTS

| | | | | |
|---|---|---|---|---|
| 8,397,166 | B2* | 3/2013 | Matsumoto | G06F 3/04883 345/179 |
| 9,823,832 | B2* | 11/2017 | Shikolay | G06F 3/0485 |
| 9,881,463 | B2* | 1/2018 | Fujisawa | G07F 17/34 |
| 2005/0177305 | A1* | 8/2005 | Han | G01C 21/367 701/431 |
| 2006/0270928 | A1* | 11/2006 | Geiger | A61B 5/4255 600/407 |
| 2007/0277126 | A1* | 11/2007 | Park | G06F 3/0485 715/866 |
| 2008/0134078 | A1* | 6/2008 | Han | G06F 3/0485 715/784 |
| 2008/0170619 | A1* | 7/2008 | Landau | H04N 21/23412 375/240.16 |
| 2008/0293488 | A1* | 11/2008 | Cheng | A63F 13/10 463/31 |
| 2008/0306683 | A1* | 12/2008 | Ando | G01C 21/3664 701/431 |
| 2009/0109245 | A1* | 4/2009 | Han | G01C 21/367 345/684 |
| 2011/0080430 | A1* | 4/2011 | Nishibe | G06F 3/04883 345/661 |
| 2012/0032988 | A1* | 2/2012 | Katayama | G09G 5/346 345/684 |
| 2012/0115569 | A1* | 5/2012 | Fujisawa | G07F 17/3213 463/20 |
| 2012/0306934 | A1* | 12/2012 | Ohashi | G09G 5/34 345/684 |
| 2014/0094254 | A1* | 4/2014 | Fujisawa | G07F 17/3202 463/20 |
| 2014/0292760 | A1* | 10/2014 | Shikolay | G06F 3/0485 345/428 |
| 2015/0089369 | A1* | 3/2015 | Ahn | G06F 3/0485 715/716 |
| 2015/0103029 | A1* | 4/2015 | Mizoue | G06F 3/0484 345/173 |
| 2015/0212580 | A1* | 7/2015 | Tabone | G06F 3/0485 345/173 |

FOREIGN PATENT DOCUMENTS

| | | |
|---|---|---|
| JP | 2006-228185 A | 8/2006 |
| JP | 4899068 B | 3/2012 |
| JP | 4899068 B2 | 3/2012 |
| JP | 2012-252559 A | 12/2012 |

OTHER PUBLICATIONS

Office Action for JP Patent Application No. 2015-522500, dated Dec. 12, 2017, 04 pages of Office Action and 03 pages of English Translation.

* cited by examiner

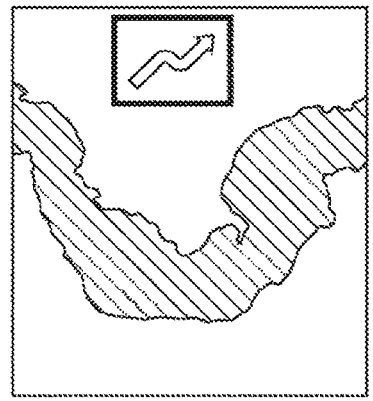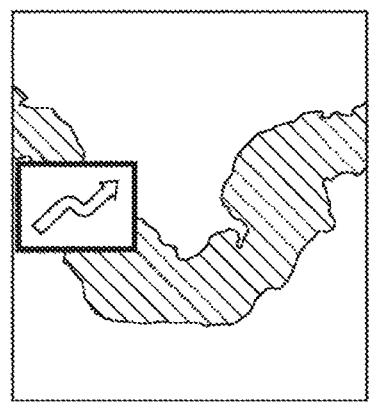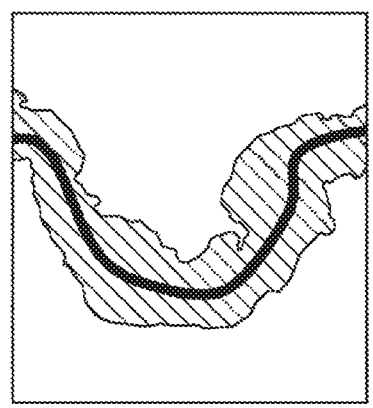
FIG.9

DISPLAY CONTROL APPARATUS AND DISPLAY CONTROL METHOD

TECHNICAL FIELD

The present disclosure relates to a display control apparatus, a display control method, and a program, and particularly to a display control apparatus, a display control method, and a program that are suitable for use in a case of observing a cell tissue as a pathological diagnosis target, for example.

BACKGROUND ART

In the medical fields, the following method is conventionally known as a method of diagnosing a cell tissue of a tumor or the like. Specifically, in this method, a part of a cell tissue is taken from a patient and sliced. The slice (hereinafter, referred to as biopsy) is placed on a slide glass and dyed. Thus, a preparation is obtained. Then, it is observed by a microscope or the like for diagnosis.

In addition, displaying a preparation image, which is obtained by scanning the preparation, on a display and observing and diagnosing it has also been proposed (e.g., see Patent Document 1).

FIG. 1 shows an outline of a conventional method of observing and diagnosing a preparation image. In the conventional method, a scroll line 12 is determined based on the shape of a biopsy 11 in a preparation image 10. Then, points from one end (starting point) to another end (terminal point) of the scroll line 12 are sequentially set as scroll centers 13 and a predetermined region with each scroll center 13 being a center is enlarged and displayed. For example, when the starting point of the scroll line 12 is set as the scroll center 13, an enlarged screen 14 is displayed. When a point near a middle of the scroll line 12 is set as the scroll center 13, an enlarged screen 15 is displayed.

Patent Document 1: Japanese Patent Application Laid-open No. 2012-252559

SUMMARY OF INVENTION

Problem to be Solved by the Invention

By the way, as described above, if the preparation images 10 are sequentially displayed along the scroll line 12, it may make an observer viewing the preparation images 10 feel discomfort, for example, so-called scrolling fatigue.

Specifically, if the scroll speed is high or the display enlargement ratio is low at a point of the scroll line 12, which has a large curvature, it may make the observer feel discomfort.

The present disclosure has been made in view of the above-mentioned circumstances and it is an object thereof to prevent the observer from feeling discomfort when an image is displayed by enlarging and scrolling.

Means for Solving the Problem

A display control apparatus that is a first aspect of the present disclosure includes an acquisition unit that obtains an input image; and a display control unit that displays the input image on a screen by scrolling the input image along a predetermined scroll line, the display control unit displaying the input image by scrolling the input image along the scroll line different according to a scroll speed that is a speed in the scrolling.

The display control unit may display the input image by scrolling the input image along the scroll line having a different curvature according to the scroll speed.

The display control unit may display the input image by scrolling the input image along the scroll line having a smaller curvature as the scroll speed becomes higher.

The display control unit may display the input image by scrolling the input image along the scroll line different according to a display enlargement ratio of the input image.

The display control unit may display the input image by scrolling the input image along a scroll line having a smaller curvature as the display enlargement ratio becomes lower.

The display control unit may select any one of a plurality of scroll lines generated by a scroll line generator according to the scroll speed and determine a point moved on the selected scroll line at the scroll speed as a scroll reference point.

The input image may include a predetermined observation target, and the display control unit may set the scroll line based on the observation target.

The display control unit may set, when the already selected scroll line is changed, a transition line for transitioning from the scroll line before the change to a scroll line after the change, and determine a point moved on the set transition line at the scroll speed as the scroll reference point.

The display control unit may display the input image by scrolling the input image with the determined scroll reference point being a reference, and perform, if a region of the observation target, which is not displayed on the screen, is generated, at least one of lowering the display enlargement ratio and lowering the scroll speed such that a scroll line having a larger curvature is selected.

The display control apparatus that is the first aspect of the present disclosure may further include a maximum scroll speed setting unit that sets a maximum scroll speed according to a curvature for each predetermined section of the generated scroll line, in which the display control unit may determine a point moved on the selected scroll line at the scroll speed with the set maximum scroll speed being an upper limit, as the scroll reference point.

The display control unit may display the input image by scrolling the input image such that the scroll reference point is positioned at substantially a center of a display region of the screen in which the input image is displayed.

The display control apparatus that is the first aspect of the present disclosure may further include a notification unit that gives notice of scroll direction information indicating a subsequent moving direction of the scroll reference point.

A display control method that is the first aspect of the present disclosure is a display control method for a display control apparatus. The display control method includes: an obtaining step of obtaining an input image by the display control apparatus; and a display control step of displaying, by the display control apparatus, the input image on a screen by scrolling the input image along a predetermined scroll line, the display control step including displaying the input image by scrolling the input image along the scroll line different according to a scroll speed that is a speed in the scrolling.

A program that is the first aspect of the present disclosure causes a computer to function as: an acquisition unit that obtains an input image; and a display control unit that displays the input image on a screen by scrolling the input image along a predetermined scroll line, the display control unit displaying the input image by scrolling the input image along the scroll line different according to a scroll speed that is a speed in the scrolling.

In the first aspect of the present disclosure, the input image is obtained. The input image is displayed on the screen by scrolling the input image along the predetermined scroll line. Note that the input image is scrolled along the scroll line different according to the scroll speed that is the speed in the scrolling.

It causes a computer that is a second aspect of the present disclosure to function as: a map display function block including an acquisition unit that obtains a map including a route serving as a movement path, as an input image, and a display control unit that displays the input image on a screen by scrolling the input image along a predetermined scroll line; and a content reproduction block that reproduces content, the display control unit displaying the input image by scrolling the input image along the scroll line different according to a scroll speed that is a speed in the scrolling.

In the second aspect of the present disclosure, the map including the route serving as the movement path is obtained as the input image. The input image is displayed on the screen by scrolling the input image along the predetermined scroll line. Note that the input image is scrolled along the scroll line different according to the scroll speed that is the speed in the scrolling.

Effect of the Invention

According to a first aspect of the present disclosure, the observer can be prevented from feeling discomfort when the input image is displayed by enlarging and scrolling.

According to a second aspect of the present disclosure, the observer can be prevented from feeling discomfort when the map is displayed by enlarging and scrolling.

BRIEF DESCRIPTION OF DRAWINGS

FIG. 9A diagram showing scroll direction display examples.

MODE(S) FOR CARRYING OUT THE INVENTION

Hereinafter, best modes for carrying out the present disclosure (hereinafter, referred to as embodiments) will be described in detail with reference to the drawings. Note that descriptions will be made in the following order.

1. First Embodiment
2. Second Embodiment
3. Third Embodiment

1. First Embodiment

[Configuration Example of Display Control Apparatus]

Figure 1:
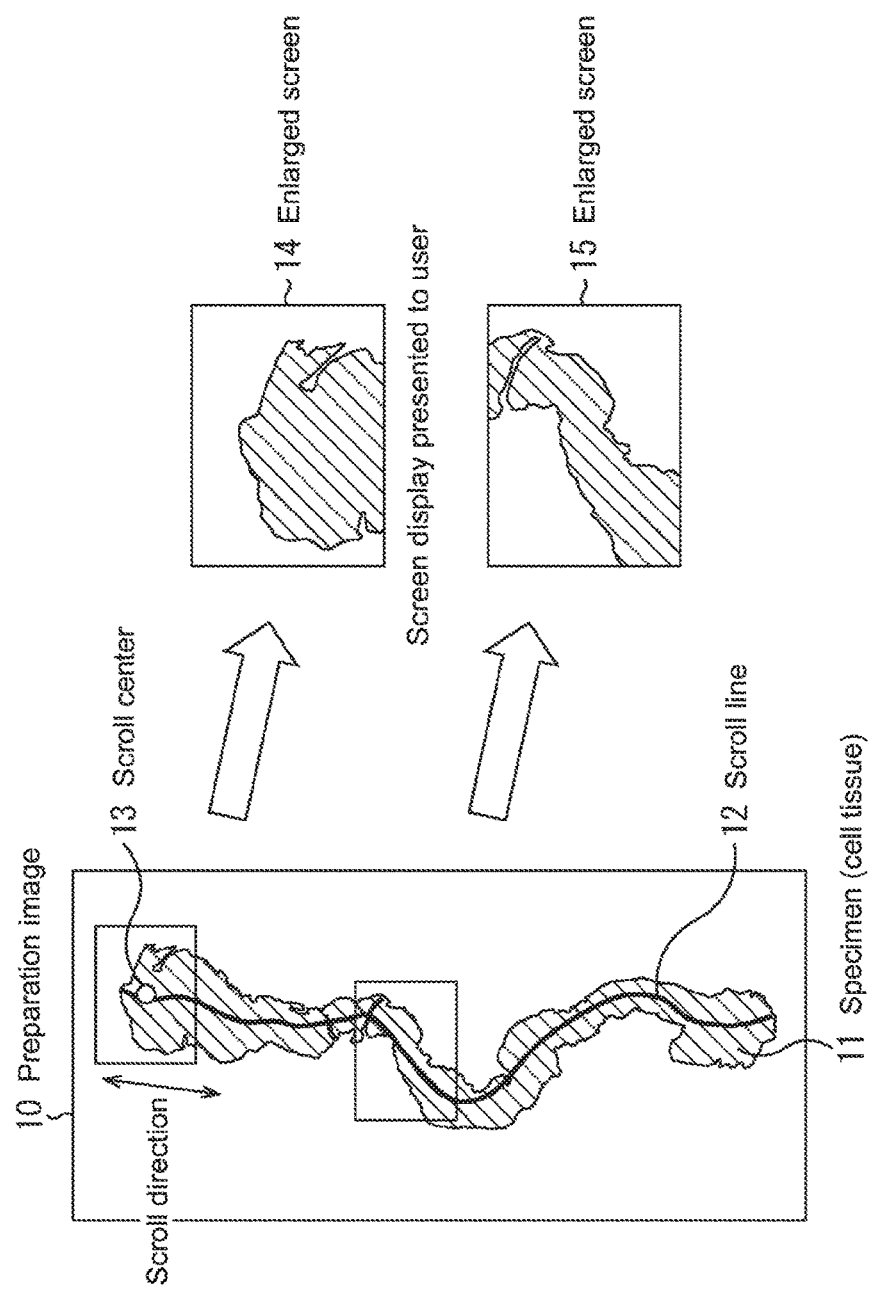
FIG. 1A diagram showing an outline of a conventional method of observing and diagnosing a preparation image.
Figure 2:
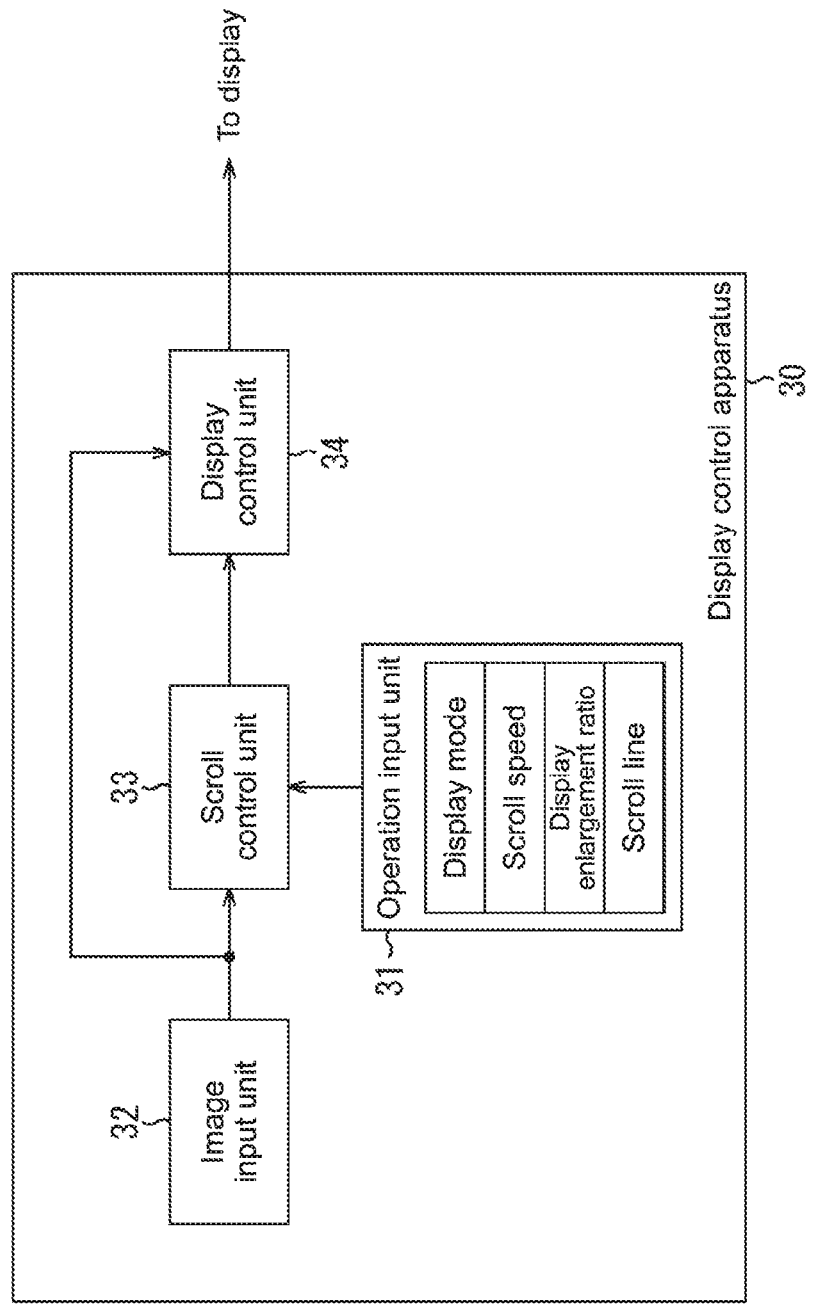
FIG. 2A block diagram showing an example of a configuration of a display control apparatus that is a first embodiment.

FIG. 2 shows a configuration example of a display control apparatus that is a first embodiment of the present disclosure. The display control apparatus 30 displays, for example, a preparation image obtained by scanning a preparation on which a biopsy such as a cell tissue is placed, on a display by enlarging and scrolling the preparation image.

The display control apparatus 30 is constituted of an operation input unit 31, an image input unit 32, a scroll control unit 33, and a display control unit 34.

The operation input unit 31 receives various setting operations (display mode selection, scroll speed setting, display enlargement ratio setting, scroll line setting, etc.) that is input from a user. The operation input unit 31 notifies the scroll control unit 33 of the setting information. Any user interface of the operation input unit 31 can be used. For example, a keyboard, a joystick, a tablet, or a mouse can be used therefor.

The display mode selection means that the user selects either one of a first display mode on which the scroll line is changed according to the scroll speed and a second display mode on which an upper limit is added to the scroll speed according to the curvature of the scroll line.

The scroll speed setting means that the user specifies a speed (the unit is, for example, Pixel/sec) when the scroll center (scroll reference point) is moved on the scroll line. The scroll speed setting can be changed at any time. The display enlargement ratio setting means that the user specifies a region to be enlarged and displayed with the scroll center being a center. The display enlargement ratio setting can be changed at any time. The scroll line setting means that the user arbitrarily sets a base scroll line on the input image.

The image input unit 32 obtains an input image such as a preparation image or the like that is set by the user (observer) as an observation target. The image input unit 32 supplies the input image to the scroll control unit 33 and the display control unit 34.

Note that the input image is not limited to the preparation image. In addition to medical images such as a CT image, an MRI image, and an X-ray image used in the medical field like the preparation image, any image not limited to the medical field (e.g., various map images) can be used as the input image.

The scroll control unit 33 determines, based on the setting information notified from the operation input unit 31, the scroll center and the enlargement ratio when the input image from the image input unit 31 is displayed by enlarging and scrolling. The scroll control unit 33 notifies the display control unit 34 of the scroll center and the enlargement ratio. The scroll control unit 33 also notifies the display control unit 34 of a direction (scroll direction) in which the current scroll center is subsequently moved.

The display control unit 34 extracts, from the input image supplied from the image input unit 32, a region according to the scroll center and display enlargement ratio notified from the scroll control unit 33, in the vertical and horizontal directions as in the input image. The display control unit 34 enlarges and outputs it to the display at the subsequent stage. Further, based on the scroll direction notified from the scroll control unit 33, the display control unit 34 also displays a subsequent scroll direction (described later with reference to FIG. 9) with the subsequent scroll direction being superimposed on the enlarged and displayed input image.

Figure 3:
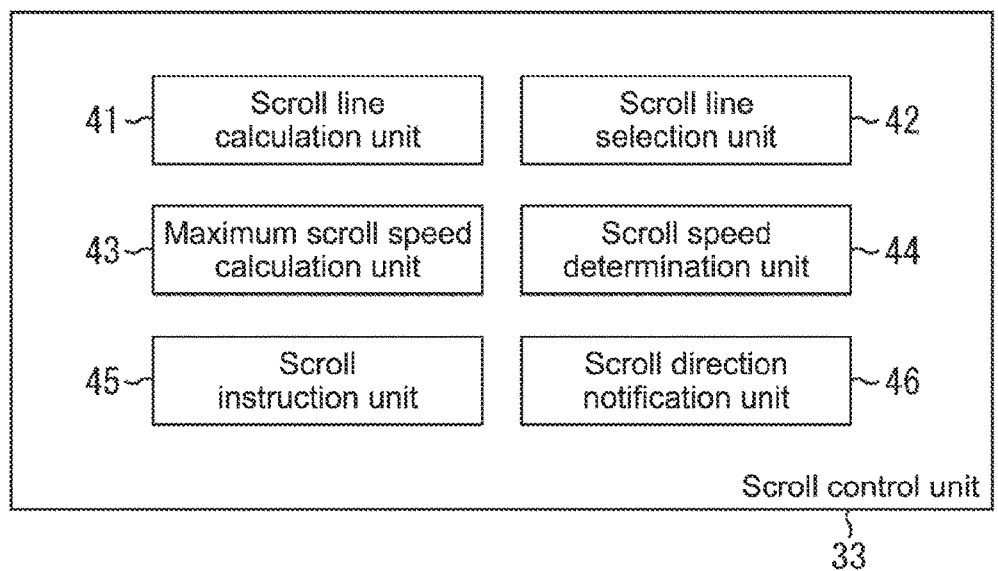
FIG. 3A block diagram showing an example of a configuration of the scroll control unit of FIG. 2.

FIG. 3 shows a detailed configuration example of the scroll control unit 33. The scroll control unit 33 includes a scroll line calculation unit 41, a scroll line selection unit 42, a maximum scroll speed calculation unit 43, a scroll speed determination unit 44, a scroll instruction unit 45, and a scroll direction notification unit 46.

The scroll line calculation unit 41 calculates a plurality of scroll lines to be tracks of the scroll center when the input image is displayed by scrolling. It will be specifically described referring to FIG. 4.

Figure 4:
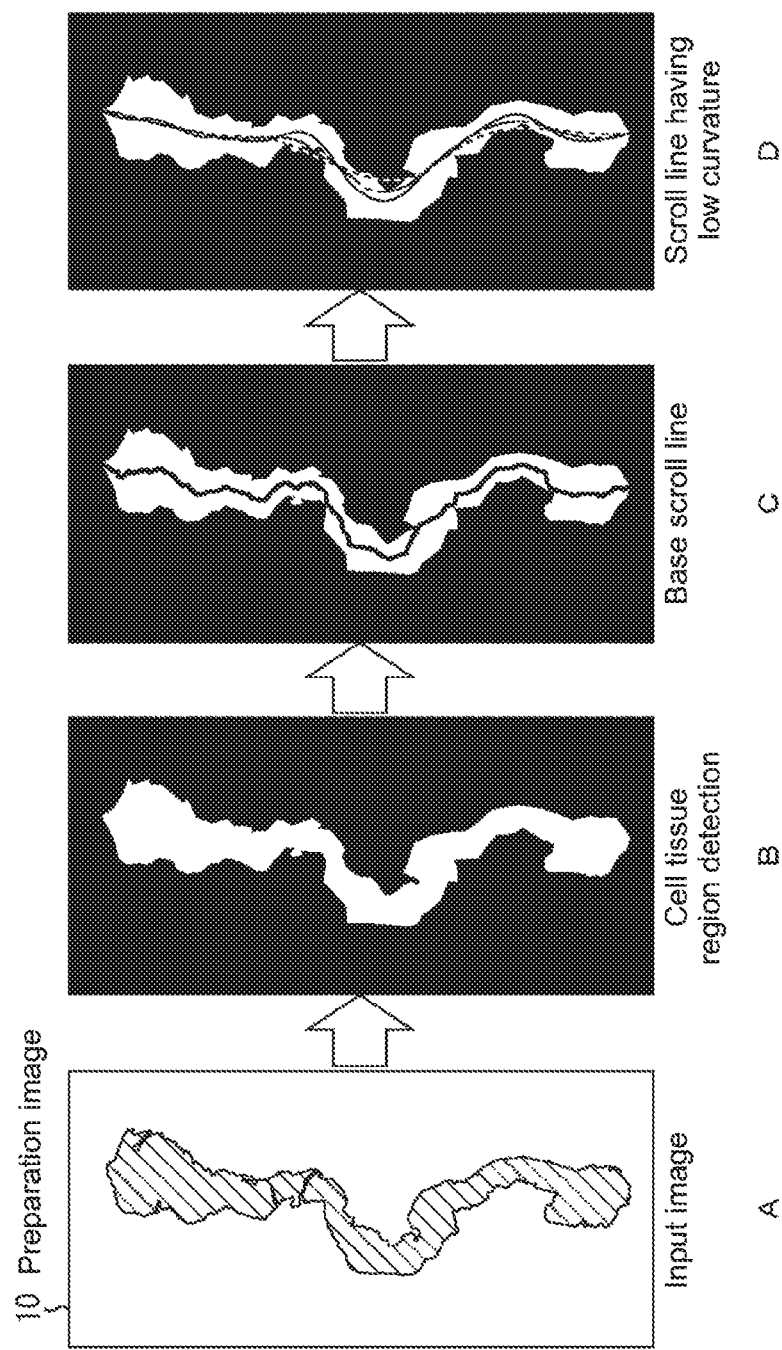
FIG. 4A diagram showing a scroll line calculation procedure.

FIG. 4 shows a calculation procedure of the scroll line. From an input image (preparation image) as shown in "A" of the figure, a cell tissue (biopsy) region is first detected as shown in "B" of the figure. Next, as shown in "C" of the figure, middle points of the detected cell tissue region (that may be substantially the middle points) in the horizontal direction. By linking the detected middle points, the base scroll line is determined. Then, its curvature K is calculated. Assuming that a coordinate value in a horizontal direction is denoted by v, a coordinate value in the vertical direction is denoted by k, and the base scroll line is denoted by v(k), the curvature K can be calculated according to a formula shown in the following equation (1).

[Expression 1]

$$K = \frac{\frac{d^2v}{dk^2}}{\left(1+\left(\frac{dv}{dk}\right)^2\right)^{\frac{3}{2}}} \quad (1)$$

Note that, in order to obtain the base scroll line, other than the above-mentioned method, thinning processing may be performed on the region of the observation target of the input image or feature points detected on the input image (e.g., points detected as cancer cell) may be linked. Alternatively, the base scroll line may be arbitrarily set by the user.

In addition, as shown in the "D" of the figure, one or more sub scroll lines with more gentle curve (reduced curvature) is calculated by applying a low pass filter to the base scroll line. As the low pass filter, a simple moving average of a predetermined width in the vertical direction can be used or a convolution with the Gaussian filter can be used. The following expression (2) shows an example in which a sub scroll line w(k) is calculated by the convolution with the Gaussian filter. Where v(k) denotes the base scroll line and u(k) denotes the Gaussian filter.

[Expression 2]

$$w(k) = \sum_j u(j)v(k-j) \quad (2)$$

Note that the sub scroll line may be obtained by performing the convolution only on a part of the base scroll line, the curvature of which is above a predetermined threshold, rather than performing the convolution on the entire base scroll line. Alternatively, filtering other than the simple moving average and the convolution with the Gaussian filter may be applied as the low pass filter.

Hereinafter, for the sake of description, in the figures, the scroll line is displayed with the scroll line being superimposed on the input image. However, it is assumed that the scroll line itself is not displayed except for a case where the scroll direction to be described later is presented to the user.

Refer back to FIG. 3. The scroll line selection unit 42 selects, from among the plurality of calculated scroll lines (base scroll line and sub scroll line), a scroll line on which the scroll center is moved based on the current scroll speed. It will be specifically described referring to FIG. 5.

Figure 5:
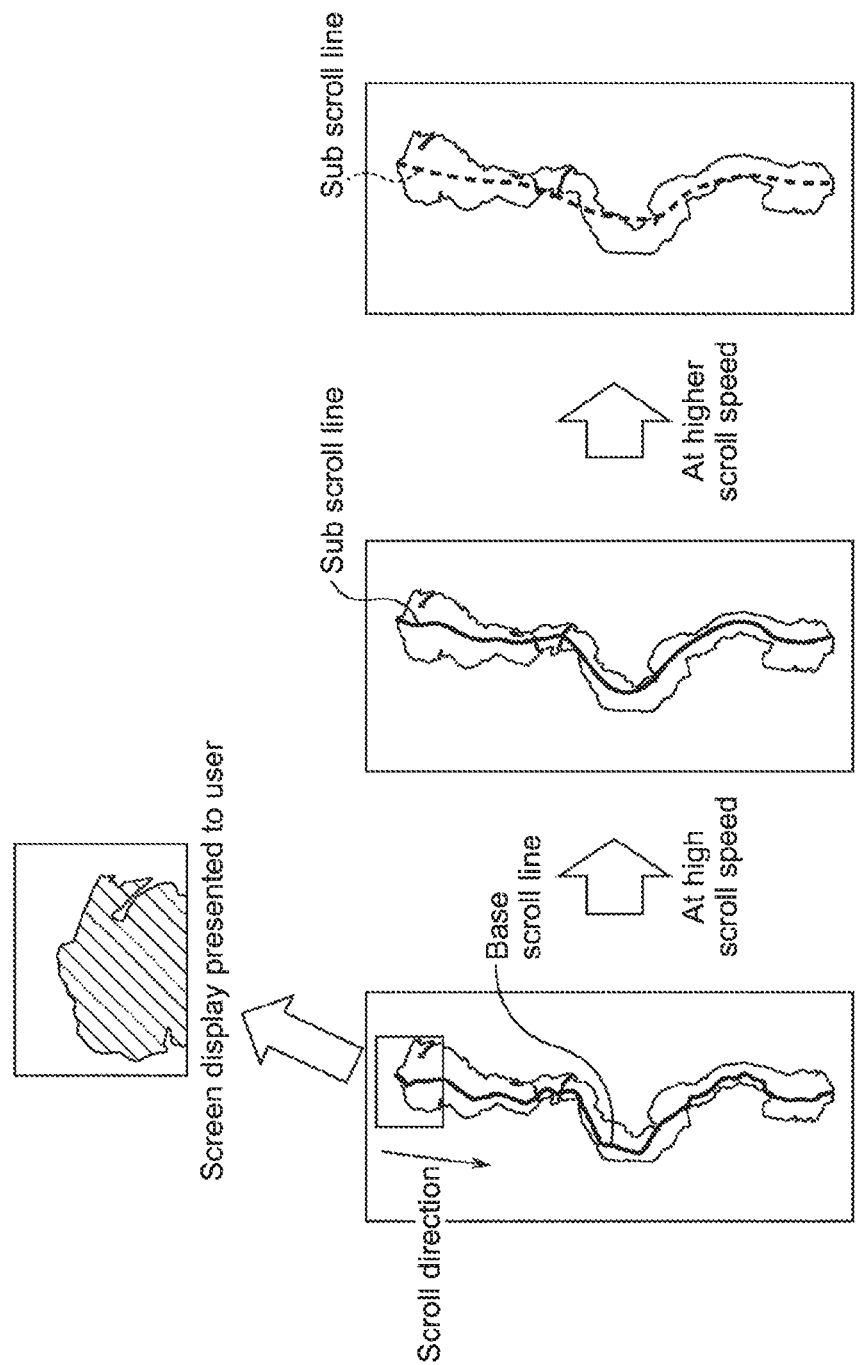
FIG. 5A diagram showing an outline of scroll line selection.

FIG. 5 shows an outline of selection of the scroll line. Note that "A" of the figure shows one obtained by superimposing the base scroll line on the input image, "B" of the figure shows one obtained by superimposing a sub scroll line having a smaller curvature than the base scroll line on the input image, and "C" of the figure shows one obtained by superimposing a sub scroll line having a much smaller curvature on the input image. The number of scroll lines is set to three in the example shown in the figure. Alternatively, a larger number of scroll lines may be prepared.

In selection of the scroll line, the range of the scroll speed is divided corresponding to the number of prepared scroll lines. In the example of FIG. 5, the range of the scroll speed is divided into three of a low speed region (0 to 75), a middle speed region, and a high speed region. When the scroll speed is in the low speed region, the base scroll line of "A" of the figure is selected. When the scroll speed reaches the middle speed region, the sub scroll line of "B" of the figure is selected. When the scroll speed reaches the high speed region, the sub scroll line of "C" of the figure is selected. In other words, when the scroll speed increases, the scroll line having a smaller curvature is selected. Thus, it is possible to reduce or prevent the scrolling fatigue to the observer.

Note that, in selecting the scroll line at the scroll line selection unit 42, the display enlargement ratio can also be used. Specifically, an apparent scroll speed expressed by the following expression (3) is introduced and the scroll line is selected based on comparison between the apparent scroll speed and first and second thresholds.

Apparent scroll speed=scroll speed*10/display enlargement ratio (3)

Here, it is conceivable that the display enlargement ratio is *2.5, *5, *10, *40, and so on. The apparent scroll speed becomes higher as the display magnification becomes lower, and hence the scroll line having a small curvature, which is unlikely to cause scrolling fatigue, is selected.

Note that the selection and change of the scroll line are performed at any time according to the change of the scroll speed and the display enlargement ratio. Specifically, when the scroll speed is changed in the middle of displaying the input image by scrolling, the scroll line can also be changed. In this case, if the scroll center is suddenly deviated, the observer feels discomfort. Therefore, the scroll line selection unit 42 sets a transition line such that the scroll center is moved smoothly from the original scroll line to the changed scroll line. The setting of the transition line will be described referring to FIG. 6.

Figure 6:
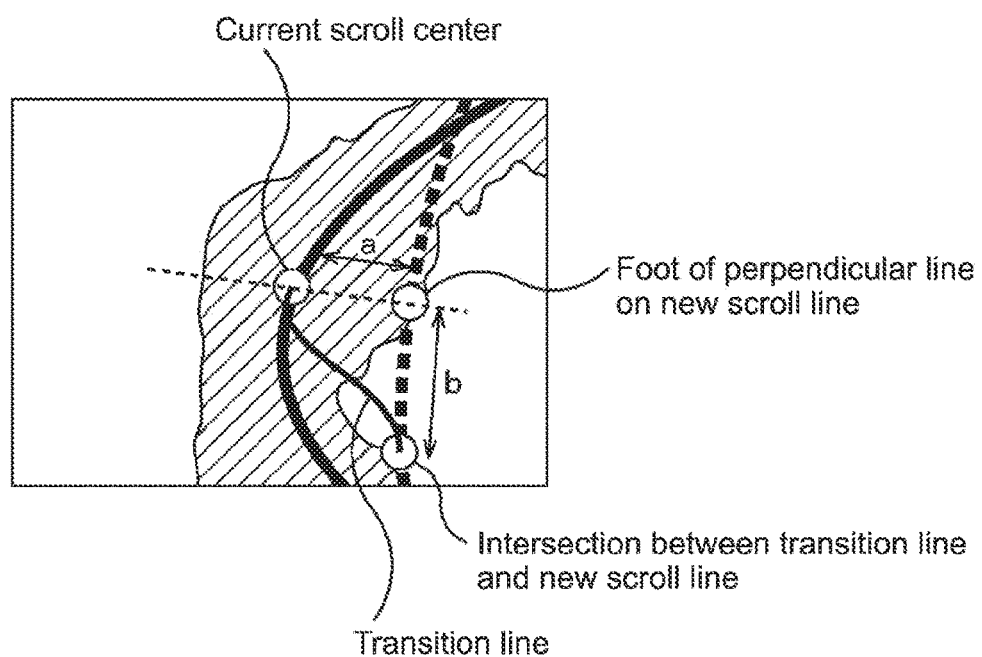
FIG. 6A diagram showing an outline of setting of a transition line.

FIG. 6 shows an outline of the setting of the transition line. Assuming that a length from the current scroll center to a foot of a perpendicular line drawn to the changed scroll line is denoted by a, a distance from the foot of this perpendicular line to an intersection between the changed scroll line and the transition line is denoted by b, and a parameter that is a constant is denoted by P, this intersection is determined such that b=P*a is satisfied. Then, a spline curve having the current scroll center as a starting point and this intersection as a terminal point is set as the transition line. By increasing the value of the parameter P, a gently curving transition line can be obtained.

Note that, rather than preparing the plurality of scroll lines in advance and selecting one of them according to the scroll speed as described above, the scroll line may be calculated dynamically based on the change of the scroll speed and the display enlargement ratio.

Refer back to FIG. 3. The maximum scroll speed calculation unit 43 divides the scroll line into predetermined sections and calculates the maximum scroll speed according to the curvature of each section. The calculation of the maximum scroll speed will be described referring to FIG. 7.

Figure 7:
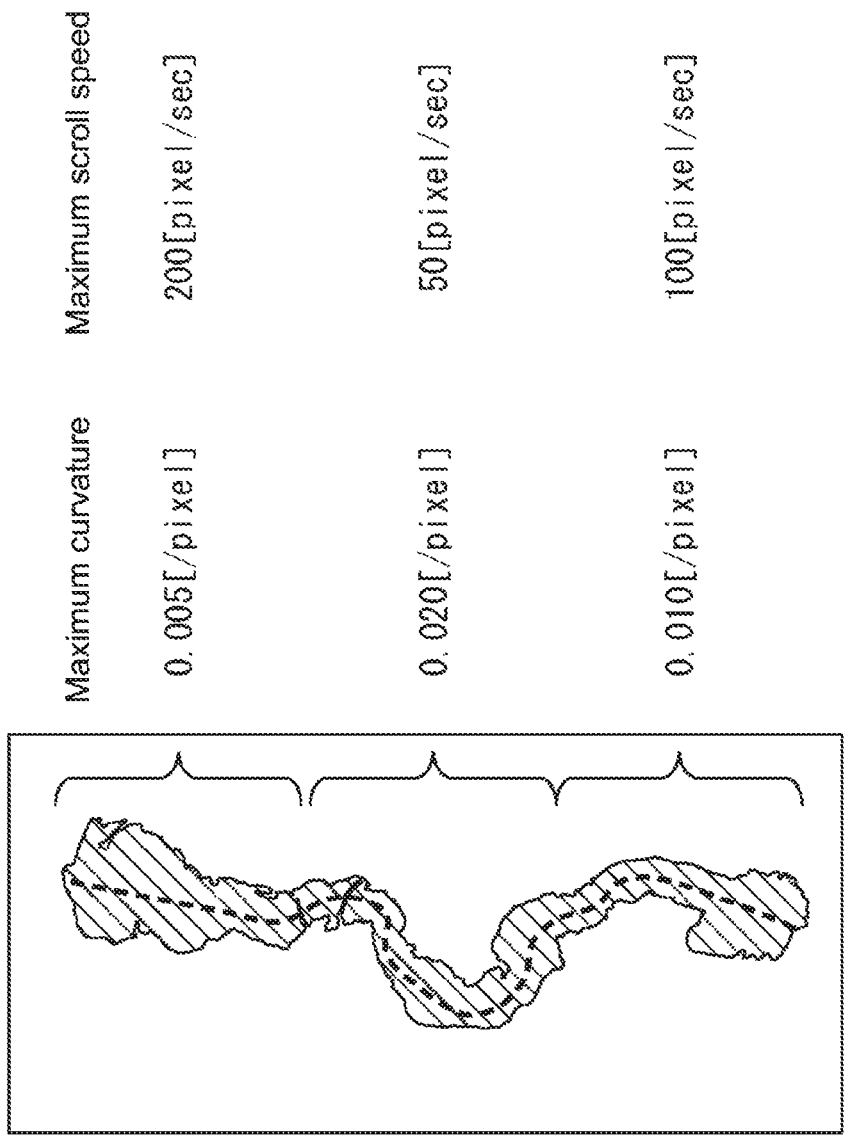
FIG. 7A diagram showing an example of a maximum scroll speed corresponding to a curvature.

FIG. 7 shows an example of the correspondence of the curvature of scroll line to the maximum scroll speed. For calculating the maximum scroll speed, the scroll line is first divided for each section having a predetermined length, the maximum curvature of each section is determined, and the maximum scroll side is calculated according to the following expression (4).

$$\text{maximum scroll speed} = 1/\text{maximum curvature} \quad (4)$$

In the example of FIG. 7, the scroll line is divided into three sections and the maximum curvature is 0.005[/pixel], 0.020[/pixel], and 0.010[/pixel] in order. Therefore, the maximum scroll speed of each section is calculated as 200 [pixel/sec], 50 [pixel/sec], and 100 [pixel/sec] in order.

Refer back to FIG. 3. The scroll speed determination unit 44 determines the scroll speed at the current scroll center in real time according to the setting information relating to the scroll speed from the operation input unit 31, using the calculated maximum scroll speed as an upper limit.

The scroll instruction unit 45 sequentially determines points moved on the scroll line or transition line selected by the scroll line selection unit 42 at the scroll speed determined by the scroll speed determination unit 44, the scroll centers. The scroll instruction unit 45 also determines the display enlargement ratio based on the setting information and the input image from the operation input unit 31. The scroll instruction unit 45 notifies the display control unit 34 of (the coordinates of) the determined scroll center and the display enlargement ratio.

It should be noted that even if the scroll speed and the display enlargement ratio are determined as described above, the entire observation target in the input image (biopsy in preparation image) cannot be displayed in some cases. In other words, a region that the observer cannot observe may be generated. A countermeasure for this will be described referring to FIG. 8.

Figure 8:
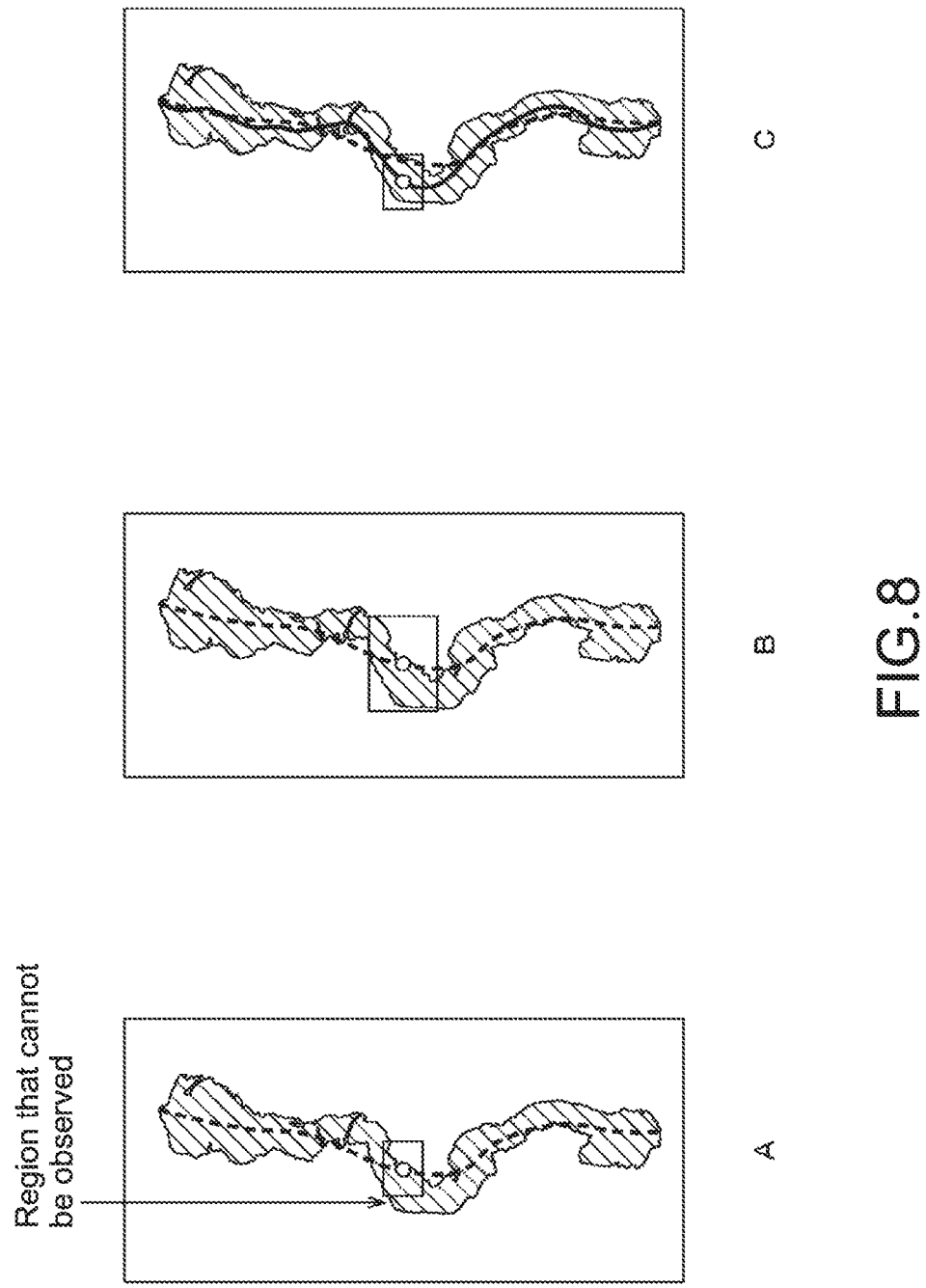
FIG. 8A diagram explaining a countermeasure for eliminating an observation region not displayed.

FIG. 8 shows outlines of two different countermeasures for eliminating the region that cannot be observed. For example, as shown in "A" of the figure, if the determined scroll speed is high and correspondingly the curvature of the selected scroll line is low and the display enlargement ratio is high, the region that the observer cannot observe can be generated.

As the first countermeasure, as shown in "B" of the figure, there is a method of lowering, if it is detected that the region that the observer cannot observe is generated, the display enlargement ratio until such a region is not generated.

As the second countermeasure, as shown in "C" of the figure, there is a method of lowering, if it is detected that the region that the observer cannot observe is generated, the scroll speed such that a scroll line having a larger curvature is selected, to thereby prevent the region that the observer cannot observe from being generated.

Note that both of the first countermeasure and the second countermeasure may be carried out.

Refer back to FIG. 3. The scroll direction notification unit 46 notifies the display control unit 34 of scroll direction information indicating a subsequent moving direction (scroll direction) of the scroll center.

FIG. 9 shows three different display examples in which the display control unit 34 presents the scroll direction to the observer based on the scroll direction information.

"A" of the figure is a first display example in which a scroll line is thinly displayed in a superimposed manner on an input screen displayed by enlarging and scrolling.

"B" of the figure is a second display example in which an image of an arrow mark indicating the scroll direction is displayed in a superimposed manner on the input screen displayed by enlarging and scrolling.

"C" of the figure is a third display example in which the image of the arrow mark indicating the scroll direction is displayed in a superimposed manner in a region other than an observation target on the input screen displayed by enlarging and scrolling (biopsy on preparation image).

By presenting the scroll direction by any of the first to third display examples, it is possible to urge the observer to prepare himself/herself for the change of the scroll direction, and to reduce or prevent the scrolling fatigue.

[Operation Explanation]

Next, an operation of the display control apparatus 30 will be described.

Figure 10:
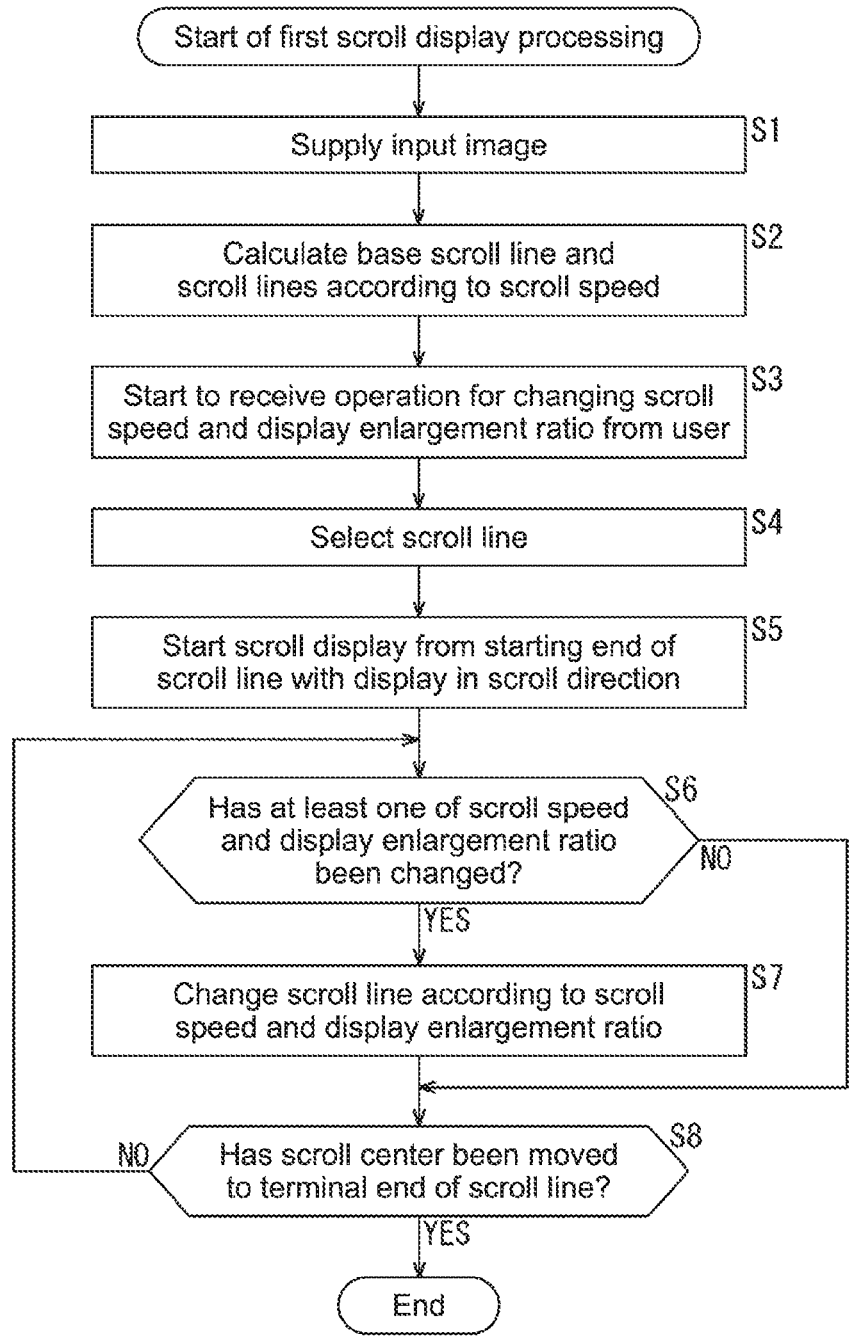
FIG. 10A flowchart explaining first scroll display processing.

FIG. 10 is a flowchart explaining the first scroll display processing in a case where the first display mode is selected.

As a premise, the first display mode is already selected by the user (observer).

In Step S1, the image input unit 32 obtains an input image such as a preparation image set by the user as an observation target and supplies it to the scroll control unit 33 and the display control unit 34.

At the scroll control unit 33, in Step S2, the scroll line calculation unit 41 calculates a base scroll line and one or more sub scroll lines having different curvatures for coping with different scroll speed.

In Step S3, the operation input unit 31 starts to receive an operation from the user for setting and changing the scroll speed and the display enlargement ratio. Based on this operation input, the scroll speed determination unit 44 determines the scroll speed.

In Step S4, based on the current scroll speed, the scroll line selection unit 42 selects the scroll line on which the scroll center is moved from among the plurality of calculated scroll lines (base scroll line and sub scroll lines). At this time, the scroll line may be selected based on the apparent scroll speed based on the display enlargement ratio.

In Step S5, the scroll instruction unit 45 sequentially determines points moved on the selected scroll line at the scroll speed, the scroll centers. Further, the scroll instruction unit 45 determines the display enlargement ratio based on the setting information and the input image from the operation input unit 31. The scroll instruction unit 45 notifies the display control unit 34 of (the coordinates of) the determined scroll center and the display enlargement ratio. At the same time, the scroll direction notification unit 46 notifies the display control unit 34 of the scroll direction information indicating the direction (scroll direction) in which the scroll center is subsequently moved.

Based on such notification, the display control unit 34 starts to display the input image by enlarging and scrolling.

In Step S6, the scroll line selection unit 42 determines whether or not at least one of the scroll speed and the display enlargement ratio has been changed. If it is determined the at least one has been changed, the processing proceeds to Step S7. In Step S7, the scroll line selection unit 42 changes the scroll line based on the at least changed one of the scroll speed and the display enlargement ratio.

Note that if it is in Step S6 determined that the scroll speed and the display enlargement ratio are not changed, Step S7 is skipped and the processing proceeds to Step S8.

In Step S8, the scroll instruction unit 45 determines whether or not the scroll center has been moved to a terminal end of the scroll line. If it is determined that the scroll center is not moved to the terminal end of the scroll line, the processing returns to Step S6 and the subsequent processes are repeated. If it is determined that the scroll center has been moved to the terminal end of the scroll line, the first scroll display processing is terminated.

According to the first scroll display processing described above, for example, if the scroll speed increases and the display enlargement ratio decreases, the scroll line is changed to one having a smaller curvature. Thus, it is possible to prevent the user (observer) from feeling discomfort, for example, scrolling fatigue.

Figure 11:
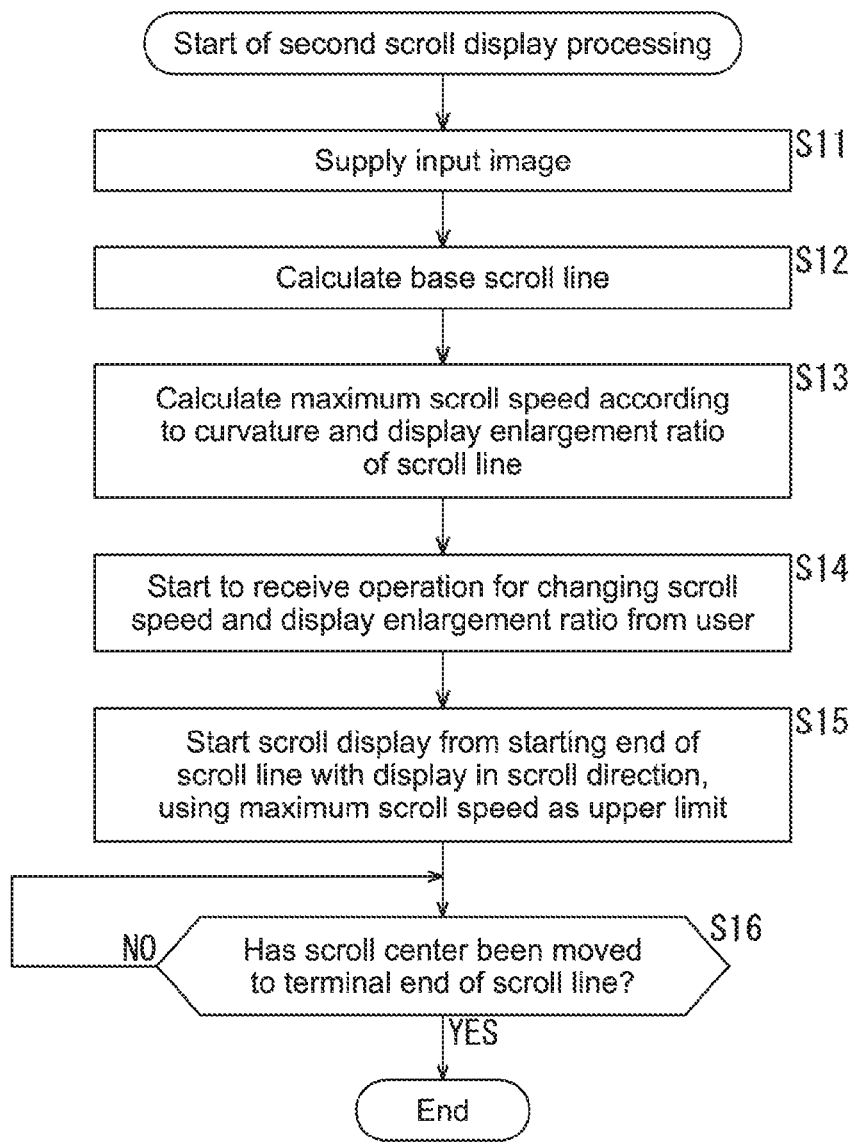
FIG. 11A flowchart explaining second scroll display processing.

Next, FIG. 11 is a flowchart explaining the second scroll display processing in a case where the second display mode is selected.

As a premise, the second display mode is already selected by the user (observer).

In Step S11, the image input unit 32 obtains an input image such as a preparation image set by the user as an observation target and supplies it to the scroll control unit 33 and the display control unit 34.

At the scroll control unit 33, in Step S12, the scroll line calculation unit 41 calculates a base scroll line. Note that, if the user arbitrarily sets the scroll line, the scroll line calculation unit 41 divides the set base scroll line into predetermined sections and calculates a curvature of each section.

In Step S13, the maximum scroll speed calculation unit 43 divides the scroll line into the predetermined sections and calculates a maximum scroll speed according to the curvature of each section.

In Step S14, the operation input unit 31 starts to receive an operation from the user for setting and changing the scroll speed and the display enlargement ratio.

In Step S15, based on the operation input from the user, the scroll speed determination unit 44 determines the scroll speed, using the maximum scroll speed of the section in which the current scroll center is located as the upper limit. The scroll instruction unit 45 sequentially determines the scroll centers based on the base scroll line and the scroll speed. The scroll instruction unit 45 also determines the display enlargement ratio based on the setting information and the input image from the operation input unit 31. The scroll instruction unit 45 notifies the display control unit 34 of the determined scroll center and display enlargement ratio. At this time, the scroll direction notification unit 46 notifies the display control unit 34 of the scroll direction information indicating the direction (scroll direction) in which the scroll center is subsequently moved.

Based on such notification, the display control unit 34 starts to display the input image by enlarging and scrolling.

In Step S16, the scroll instruction unit 45 determines whether or not the scroll center has been moved to the terminal end of the base scroll line. If it is determined that the scroll center is not moved to the terminal end of the base scroll line, the scroll instruction unit 45 continues notifying the display control unit 34 of the scroll center and the display enlargement ratio. If it is determined the scroll center has been moved to the terminal end of the base scroll line, this second scroll display processing is terminated.

According to the second scroll display processing described above, the maximum scroll speed is set according to the curvature of each section of the base scroll line. For example, if the scroll speed increases and the display enlargement ratio decreases, the scroll line is changed to one having a smaller curvature. Thus, it is possible to prevent the user (observer) from feeling discomfort, for example, scrolling fatigue.

In the explanation above of the second scroll display processing, the scroll center is moved on the base scroll line as a track. However, for example, the scroll center may be moved to the scroll center on the sub scroll line selected by the user as a track. In this case, at the maximum scroll speed calculation unit 43, the sub scroll line is divided into predetermined sections and a maximum scroll speed according to a curvature of each section is calculated.

Although the display control apparatus 30 is operated on the first display mode or second display mode selected by the user in the explanation above, a configuration may be made such that only one display mode is operable.

[Modified Example]

Figure 12:
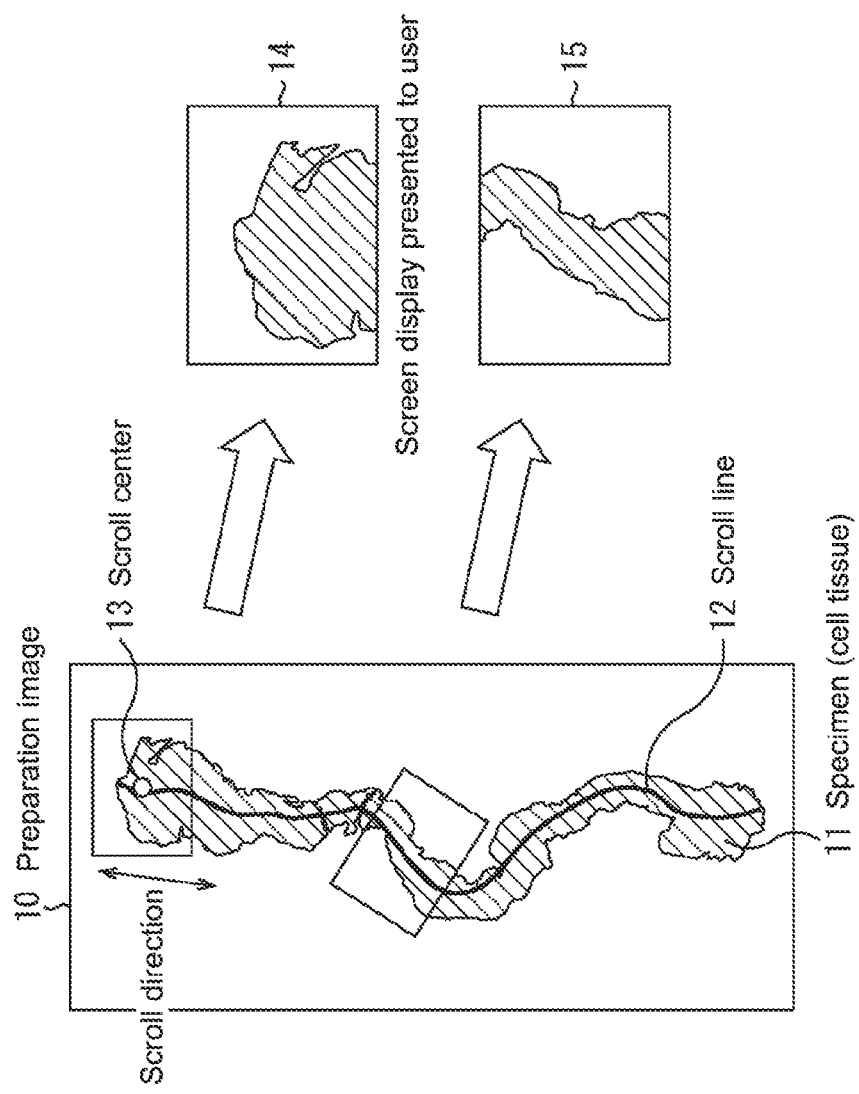
FIG. 12A diagram showing a modified example of display by enlarging and scrolling.

FIG. 12 shows a modified example of the display by enlarging and scrolling. As shown in the figure, depending on the tilt of the scroll line at the scroll center, a region to be enlarged and displayed may be extracted in a direction that does not necessarily coincide with the vertical and horizontal directions of the input image and may be displayed by enlarging and scrolling. Also in this case, it is desirable that the upper limit is added to the scroll speed according to the curvature of the scroll line or the tilt at the scroll center.

Figure 13:
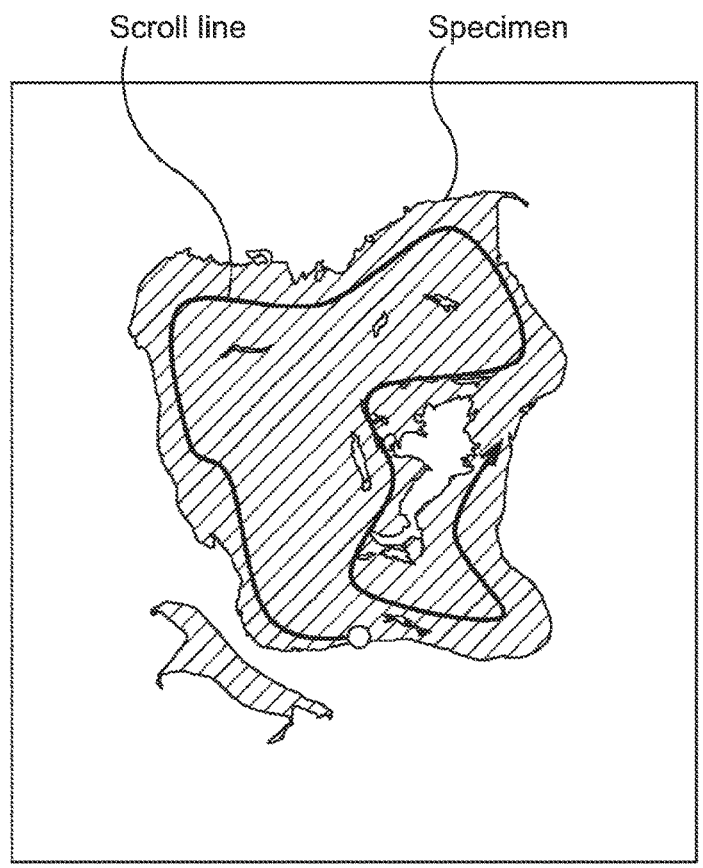
FIG. 13A diagram showing another example of a setting method for a scroll line.

FIG. 13 shows another example of a setting method for the base scroll line. In the explanation above, the base scroll line is the line linking the middle points of the region of the observation target (biopsy). As shown in the figure, the medical image may be set as the input image and sites in the medical image, which are highly suspected to contain cancer, infection, or the like may be detected by image recognition processing for detecting them and a line linking them may be set as the base scroll line.

Further, although not shown in the figure, for example, by image processing of extracting a boundary between a cell tissue region and the background, the base scroll line may surround the cell tissue region.

Figure 14:
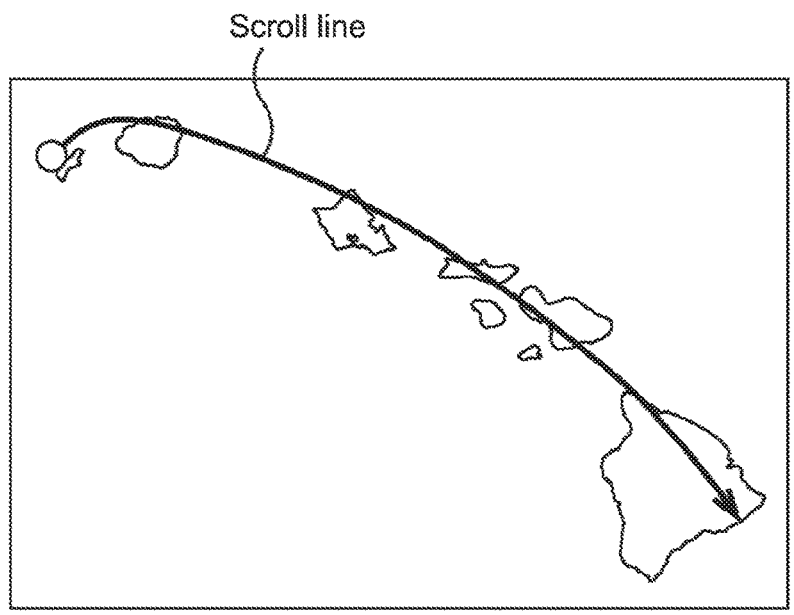
FIG. 14A diagram showing a display example when the present disclosure is applied to a case of viewing a map.

FIG. 14 shows a display example when the present disclosure is applied to a case of scrolling and viewing a map along its geographical features. In this case, the map may be set as the input image. The base scroll line may be generated by, for example, automatically linking points of prefectural capitals and centers of municipalities depending on the size of the viewed map. Otherwise, the base scroll line may be arbitrarily set by the user.

Figure 15:
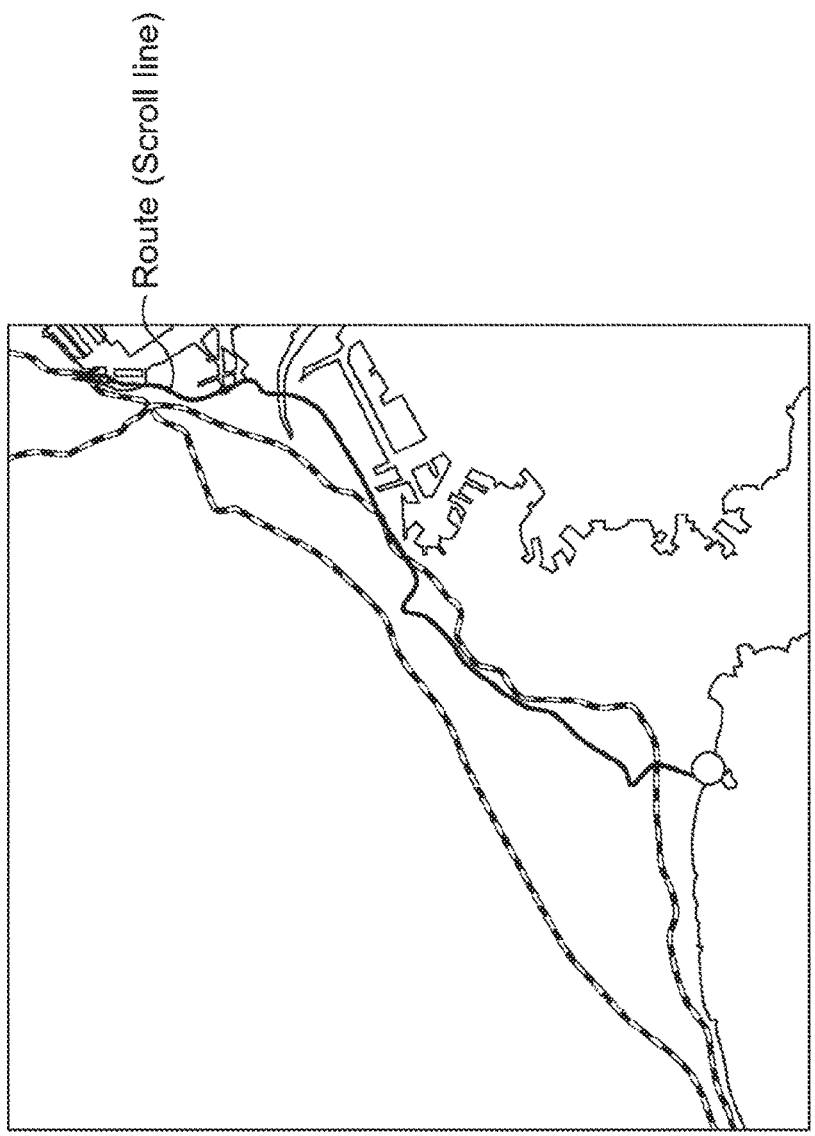
FIG. 15A diagram showing a display example when the present disclosure is applied to a case of viewing a map along a route.

FIG. 15 shows, for example, a display example when the present disclosure is applied to a case of scrolling and viewing a map along a route in moving from a point to another point in a navigation application. In this case, the map is set as the input image and the route set by the navigation application serves as the base scroll line.

2. Second Embodiment

[Configuration Example of Information Processing Apparatus]

Figure 16:
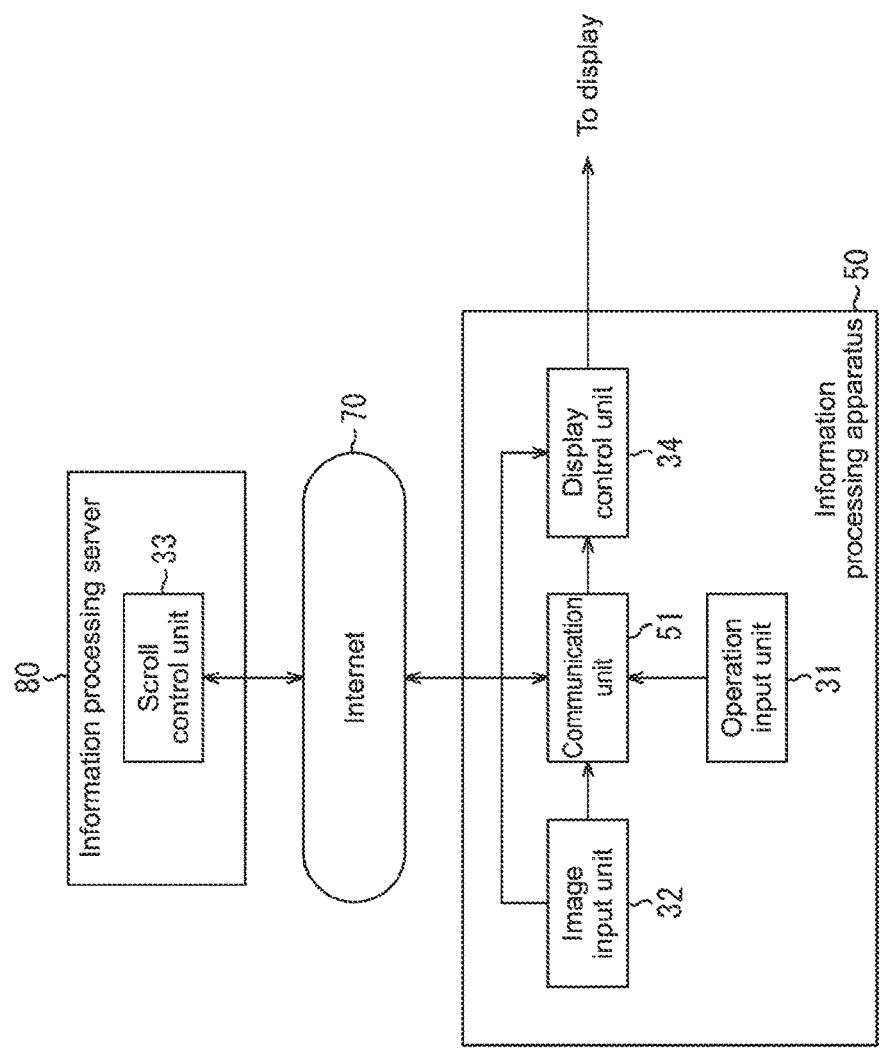
FIG. 16A block diagram showing configuration examples of an information processing apparatus that is a second embodiment and an information processing server.

FIG. 16 shows configuration examples of an information processing apparatus 50 that is a second embodiment of the present disclosure and an information processing server 80.

The second embodiment is obtained by incorporating the scroll control unit 33 of the display control apparatus 30 that is the first embodiment shown in FIG. 2 in the information processing server 80 connected via the Internet 70. Note that the common components between the second embodiment and the first embodiment will be denoted by the same numbers and descriptions thereof will be omitted.

A communication unit 51 of the information processing apparatus 50 is connected to the information processing server 80 via the Internet 70, supplies the input image from the image input unit 32 to the scroll control unit 33, and notifies the scroll control unit 33 of the setting information from the operation input unit 31. Further, the communication unit 51 receives, from the scroll control unit 33, the scroll center and the enlargement ratio when the input image is displayed by enlarging and scrolling and a direction (scroll direction) in which the current scroll center is subsequently moved. The communication unit 51 notifies the display control unit 34 of them.

According to the second embodiment shown in FIG. 16, the above-mentioned first scroll display processing or second scroll display processing can be controlled using so-called cloud computing.

3. Third Embodiment

[Configuration Example of Mobile Terminal]

Figure 17:
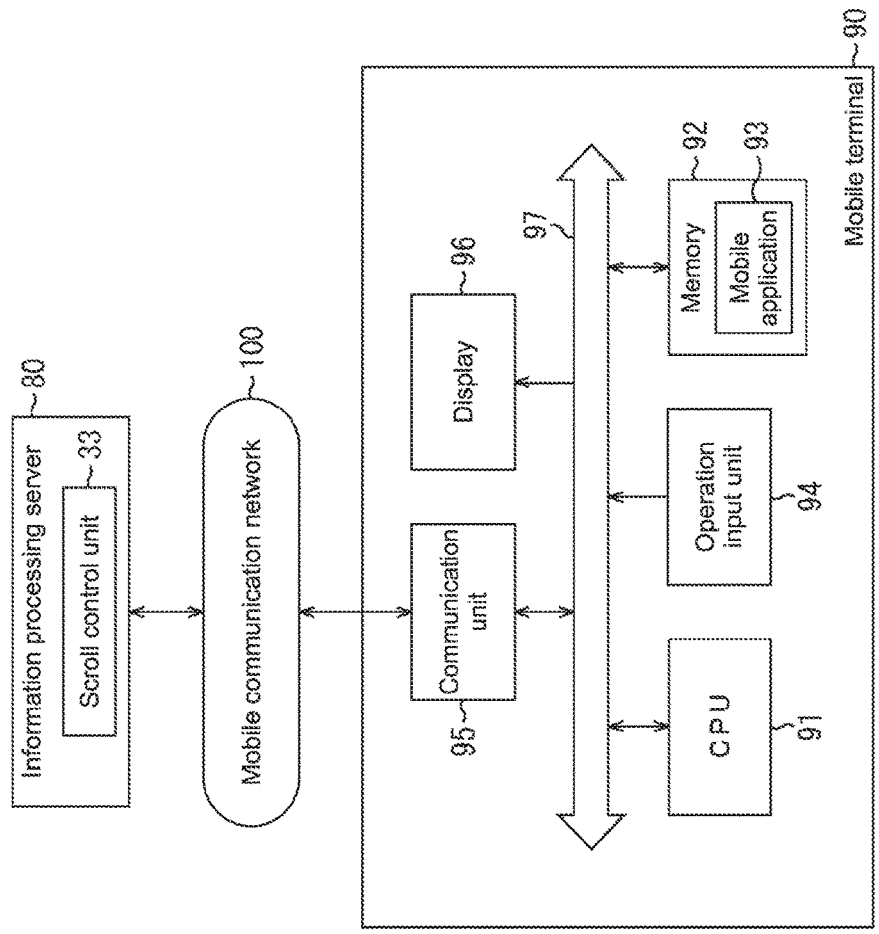
FIG. 17A block diagram showing a configuration example of a mobile terminal that is third embodiment.

FIG. 17 shows a configuration example of a mobile terminal 90 that is a third embodiment of the present disclosure. Note that the common components between the third embodiment and the first embodiment will be denoted by the same numbers and descriptions thereof will be omitted.

It is assumed that the mobile terminal 90 is a portable computer, specifically, a smartphone, a cellular phone, a tablet PC, or the like.

The mobile terminal 90 includes a CPU 91, a memory 92, an operation input unit 94, a communication unit 95, and a display 96. They are connected to one another via a bus 97. In the mobile terminal 90, the CPU 91 reads out and starts a mobile application 93 stored in the memory 92, such that various operations can be executed. For example, the scroll control unit 33 that is connected to the information processing server 80 via a mobile communication network 100 and provided in the information processing server 80 can be used.

Figure 18:
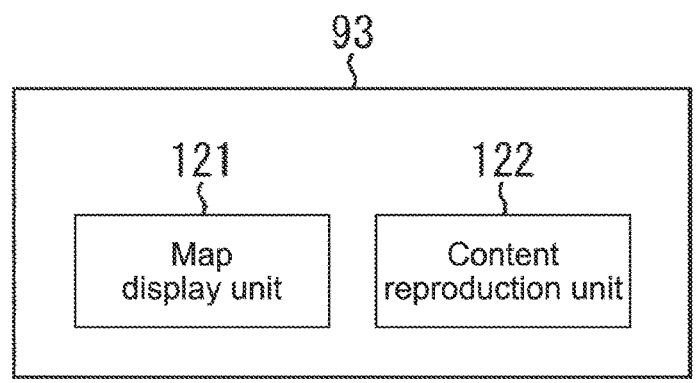
FIG. 18A diagram showing functional blocks realized by a mobile application.

FIG. 18 shows an example of functional blocks that can be realized by the CPU 91 starting the mobile application 93. In the case shown in the figure, a map display unit 121 and a content reproduction unit 122 are realized at the same time. The map display unit 121 is a functional block that realizes a so-called navigation function. Further, the map display unit 121 can use the scroll control unit 33 in the case where the map is scrolled and displayed along the route in moving from a point to another point. Note that the map display unit 121 may have functions of the scroll control unit 33.

The content reproduction unit 122 is a functional block that reproduces content such as music and a moving image.

According to the third embodiment shown in FIG. 17, a navigation is executed in parallel to content reproduction and, for this, the above-mentioned first scroll display processing or second scroll display processing can be controlled using so-called cloud computing.

In the above-mentioned first to third embodiments, the case where a part of the input image is extracted and enlarged and then displayed on the entire display has been described. However, the present disclosure can also be applied to a case where it is displayed in a sub-screen (so-called floating window) on the display.

By the way, the above-mentioned series of processing may be executed by hardware or may be executed by software. If the series of processing is executed by software, a program configuring the software is installed into a computer. The computer includes a computer incorporated in dedicated hardware, for example, a general-purpose personal computer that can execute various functions by installing various programs, and the like.

Figure 19:
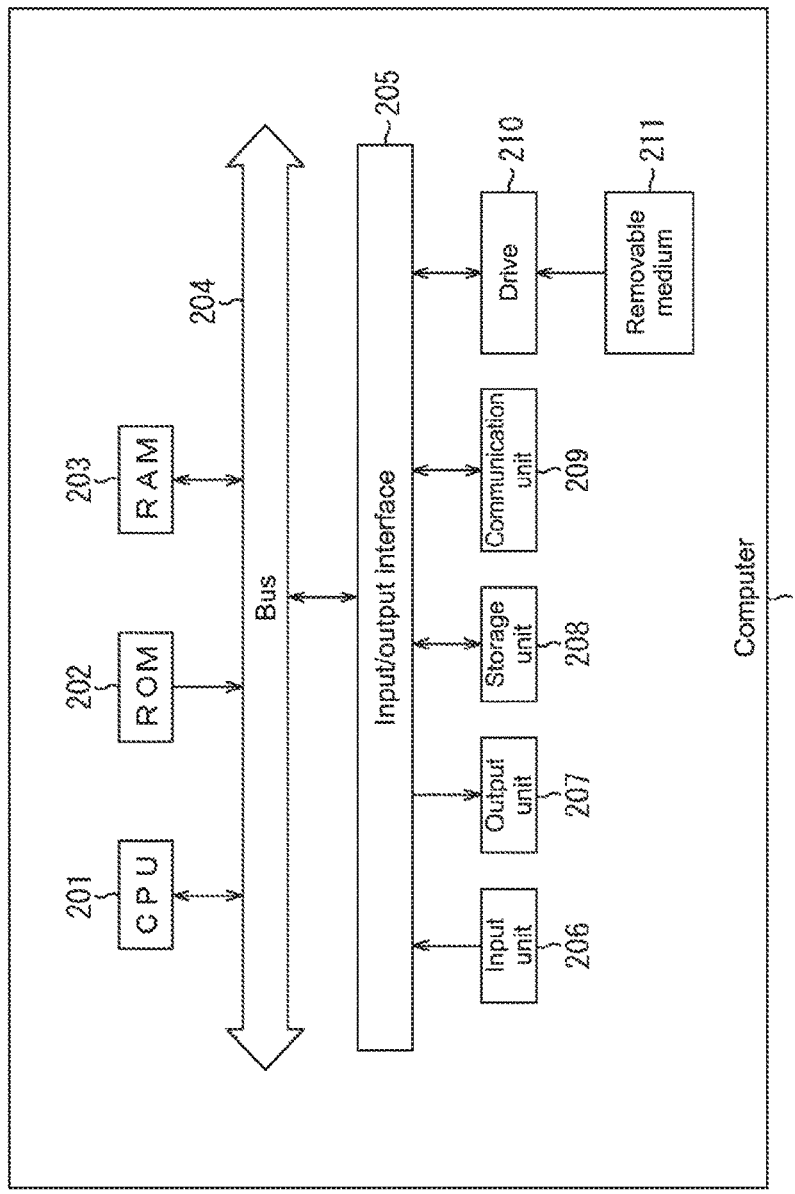
FIG. 19A block diagram showing a configuration example of a computer.

FIG. 19 is a block diagram showing a hardware configuration example of the computer that executes the above-mentioned series of processing according to the program.

In this computer 200, a CPU (Central Processing Unit) 201, a ROM (Read Only Memory) 202, and a RAM (Random Access Memory) 203 are connected to one another via a bus 204.

To the bus 204, further connected is an input/output interface 205. To the input/output interface 205, connected are an input unit 206, an output unit 207, a storage unit 208, a communication unit 209, and a drive 210.

The input unit 206 is formed of a keyboard, a mouse, a microphone, and the like. The output unit 207 is formed of a display, a speaker, and the like. The storage unit 208 is formed of a hard disk, a nonvolatile memory, and the like. The communication unit 209 is formed of a network interface and the like. The drive 210 drives a removable medium 211 such as a magnetic disk, an optical disc, a magneto-optical disk, and a semiconductor memory.

In the thus configured computer 200, the CPU 201 loads the program stored in the storage unit 208 into the RAM 203 via the input/output interface 205 and the bus 204, for example, and executes it for the above-mentioned series of processing.

Note that the program executed by the computer may be a program in which processes are performed in time series in the order described herein or may be a program in which processes are performed in parallel or at a necessary timing, for example, when calling.

The embodiments of the present disclosure are not limited to the above-mentioned embodiments and may be variously changed without departing from the gist of the present disclosure.

It should be noted that the present disclosure may also take the following configurations.

(1) A display control apparatus, including:
   an acquisition unit that obtains an input image; and
   a display control unit that displays the input image on a screen by scrolling the input image along a predetermined scroll line, the display control unit displaying the input image by scrolling the input image along the scroll line different according to a scroll speed that is a speed in the scrolling.
(2) The display control apparatus according to (1), in which
   the display control unit displays the input image by scrolling the input image along the scroll line having a different curvature according to the scroll speed.
(3) The display control apparatus according to (2), in which
   the display control unit displays the input image by scrolling the input image along the scroll line having a smaller curvature as the scroll speed becomes higher.
(4) The display control apparatus according to any one of (1) to (3), in which
   the display control unit displays the input image by scrolling the input image along the scroll line different according to a display enlargement ratio of the input image.
(5) The display control apparatus according to (4), in which
   the display control unit displays the input image by scrolling the input image along a scroll line having a smaller curvature as the display enlargement ratio becomes lower.
(6) The display control apparatus according to any one of (1) to (5), in which
   the display control unit selects any one of a plurality of scroll lines generated by a scroll line generator according to the scroll speed and determines a point moved on the selected scroll line at the scroll speed as a scroll reference point.
(7) The display control apparatus according to any one of (1) to (6), in which
   the input image includes a predetermined observation target, and
   the display control unit sets the scroll line based on the observation target.
(8) The display control apparatus according to any one of (1) to (7), in which
   the display control unit sets, when the already selected scroll line is changed, a transition line for transitioning from the scroll line before the change to a scroll line after the change, and determines a point moved on the set transition line at the scroll speed as the scroll reference point.
(9) The display control apparatus according to any one of (1) to (8), in which
   the display control unit displays the input image by scrolling the input image with the determined scroll reference point being a reference, and performs, if a region of the observation target, which is not displayed on the screen, is generated, at least one of lowering the display enlargement ratio and lowering the scroll speed such that a scroll line having a larger curvature is selected.
(10) The display control apparatus according to any one of (1) to (9), further including
   a maximum scroll speed setting unit that sets a maximum scroll speed according to a curvature for each predetermined section of the generated scroll line, in which
   the display control unit determines a point moved on the selected scroll line at the scroll speed with the set maximum scroll speed being an upper limit, as the scroll reference point.
(11) The display control apparatus according to any one of (1) to (10), in which
   the display control unit displays the input image by scrolling the input image such that the scroll reference point is positioned at substantially a center of a display region of the screen in which the input image is displayed.
(12) The display control apparatus according to any one of (1) to (11), further including
   a notification unit that gives notice of scroll direction information indicating a subsequent moving direction of the scroll reference point.

DESCRIPTION OF REFERENCE NUMERALS 30 display control apparatus
31 operation input unit
32 image input unit
33 scroll control unit
34 display control unit
41 scroll line calculation unit
42 scroll line selection unit
43 maximum scroll speed calculation unit
44 scroll speed determination unit
45 scroll instruction unit
46 scroll direction notification unit
50 information processing apparatus
80 information processing server
90 mobile terminal
93 mobile application
200 computer
201 CPU

The invention claimed is:
1. A display control apparatus, comprising:
   a central processing unit (CPU) configured to:
      acquire an input image;
      set a first scroll line from a plurality of scroll lines for a scroll of the input image along the first scroll line, wherein the first scroll line is set based on a first display enlargement ratio of the input image;
      control display of the input image on a display screen based on the scroll of the input image along the first scroll line at a first scroll speed;
      determine a second scroll speed of the scroll;
      set a second scroll line from the plurality of scroll lines based on the second scroll speed;
      determine a first length of a perpendicular line from a current scroll point on the first scroll line to a foot point on the second scroll line,
         wherein the perpendicular line is perpendicular to the second scroll line;
      determine a second length based on a product of the first length and a threshold value;
      determine an intersection point on the second scroll line based on the second length;
      set a transition line from the current scroll point to the intersection point;
      change from the first scroll line to the second scroll line through the transition line; and
      control the display of the input image on the display screen based on the scroll of the input image along the transition line prior to the scroll along the second scroll line.
2. The display control apparatus according to claim 1, wherein
   the plurality of scroll lines has a plurality of curvatures, and
   the first scroll line has a first curvature of the plurality of curvatures and the second scroll line has a second curvature of the plurality of curvatures.

3. The display control apparatus according to claim 2, wherein the CPU is further configured to:
  determine a third scroll speed of the scroll;
  set a third scroll line having a third curvature of the plurality of curvatures based on the third scroll speed, wherein
    the third curvature is smaller than the second curvature, and
    the third scroll speed is greater than the second scroll speed; and
  display, on the display screen, the input image along the third scroll line having the third curvature.

4. The display control apparatus according to claim 1, wherein
  the CPU is further configured to set the second scroll line for the scroll of the input image along the second scroll line, based on a second display enlargement ratio of the input image,
  a curvature of the second scroll line is smaller than a curvature of the first scroll line, and
  the second display enlargement ratio is lower than the first display enlargement ratio.

5. The display control apparatus according to claim 1, wherein the CPU is further configured to:
  generate the plurality of scroll lines by a scroll line generator;
  determine a scroll reference point on the second scroll line; and
  move the scroll reference point on the second scroll line at the second scroll speed.

6. The display control apparatus according to claim 5, wherein
  the input image includes an observation target, and
  the CPU is further configured to set the second scroll line based on the observation target.

7. The display control apparatus according to claim 5, wherein the CPU is further configured to:
  determine the scroll reference point on the transition line; and
  move the scroll reference point on the transition line at the second scroll speed.

8. The display control apparatus according to claim 7, wherein the CPU is further configured to:
  control the display screen to display the input image based on the scroll of the input image with the scroll reference point as a reference;
  decrease at least one of the first display enlargement ratio of the input image or the second scroll speed based on a first region of an observation target, wherein
    the input image includes the observation target, and
    the first region is other than a second region of the input image that is displayed on the display screen; and
  select the first scroll line for the display of the input image based on the decrease of the at least one of the first display enlargement ratio or the second scroll speed, wherein a curvature of the first scroll line is greater than a curvature of the second scroll line.

9. The display control apparatus according to claim 7, wherein the CPU is further configured to:
  set a maximum scroll speed based on a curvature of the second scroll line, for each section of a plurality of sections of the second scroll line; and
  move the scroll reference point on the second scroll line at the second scroll speed with the set maximum scroll speed as an upper limit.

10. The display control apparatus according to claim 5, wherein the CPU is further configured to control display of the input image on the display screen based on the scroll of the input image such that the scroll reference point is at substantially a center of a display region of the display screen.

11. The display control apparatus according to claim 5, wherein the CPU is further configured to notify scroll direction information indicating a subsequent moving direction of the scroll reference point.

12. A display control method, comprising:
  in a display control apparatus:
    acquiring an input image;
    setting a first scroll line for a scroll of the input image along the first scroll line,
      wherein the first scroll line is set based on a first display enlargement ratio of the input image;
    controlling display of the input image on a display screen based on the scroll of the input image along the first scroll line at a first scroll speed;
    determining a second scroll speed of the scroll;
    setting a second scroll line based on the second scroll speed;
    determining a first length of a perpendicular line from a current scroll point on the first scroll line to a foot point on the second scroll line,
      wherein the perpendicular line is perpendicular to the second scroll line;
    determining a second length based on a product of the first length and a threshold value;
    determining an intersection point on the second scroll line based on the second length;
    setting a transition line from the current scroll point to the intersection point;
    changing from the first scroll line to the second scroll line through the transition line; and
    controlling the display of the input image on the display screen based on the scroll of the input image along the transition line prior to the scroll along the second scroll line.

13. A non-transitory computer-readable medium having stored thereon computer-readable instructions which, when executed by a processor of a display control apparatus, cause the display control apparatus to execute operations, the operations comprising:
  acquiring an input image;
  setting a first scroll line for a scroll of the input image along the first scroll line,
    wherein the first scroll line is set based on a first display enlargement ratio of the input image;
  controlling display of the input image on a display screen based on the scroll of the input image along the first scroll line at a first scroll speed;
  determining a second scroll speed of the scroll;
  setting a second scroll line based on the second scroll speed;
  determining a first length of a perpendicular line from a current scroll point on the first scroll line to a foot point on the second scroll line,
    wherein the perpendicular line is perpendicular to the second scroll line;
  determining a second length based on a product of the first length and a threshold value;
  determining an intersection point on the second scroll line based on the second length;
  setting a transition line from the current scroll point to the intersection point;
  changing from the first scroll line to the second scroll line through the transition line; and controlling the display of the input image on the display screen based on the scroll of the input image along the transition line prior to the scroll along the second scroll line.

14. A non-transitory computer-readable medium having stored thereon computer-executable instructions which, when executed by a processor of a display control apparatus, cause the processor to execute operations, the operations comprising:

acquiring, as an input image, a map including a route as a movement path;

setting a first scroll line for a scroll of the input image along the first scroll line,
wherein the first scroll line is set based on a first display enlargement ratio of the input image;

controlling display of the input image on a display screen based on the scroll of the input image along the first scroll line at a first scroll speed;

determining a second scroll speed of the scroll;

setting a second scroll line based on the second scroll speed;

determining a first length of a perpendicular line from a current scroll point on the first scroll line to a foot point on the second scroll line,
wherein the perpendicular line is perpendicular to the second scroll line;

determining a second length based on a product of the first length and a threshold value;

determining an intersection point on the second scroll line based on the second length;

setting a transition line from the current scroll point to the intersection point;

changing from the first scroll line to the second scroll line through the transition line; and controlling the display of the input image on the display screen based on the scroll of the input image along the transition line prior to the scroll along the second scroll line.

* * * * *